United States Patent Office 2,914,106
Patented Nov. 24, 1959

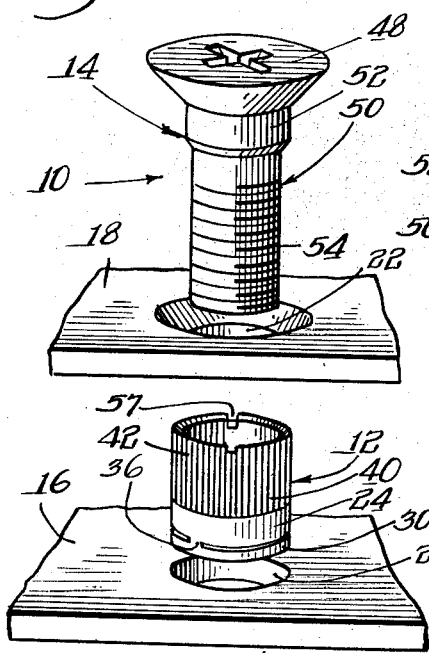
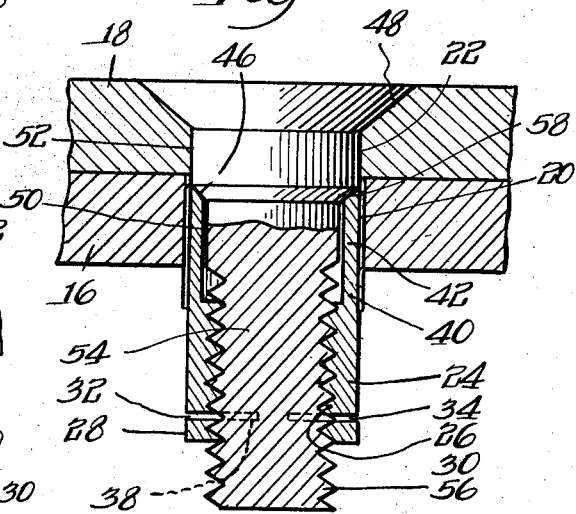
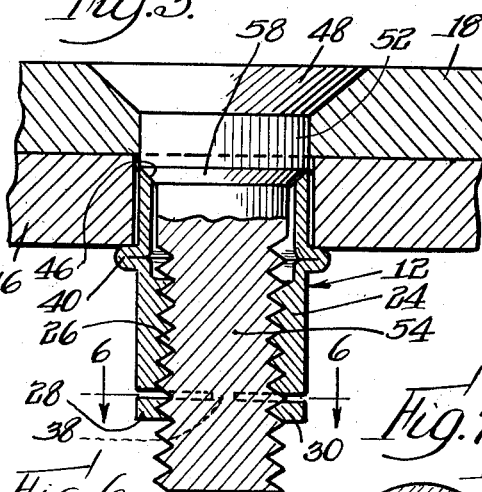
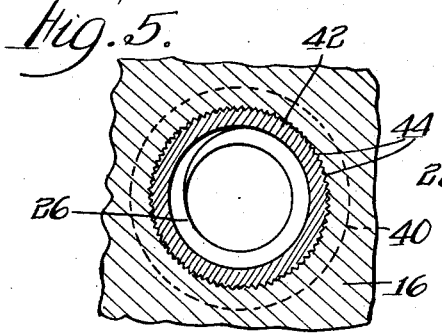
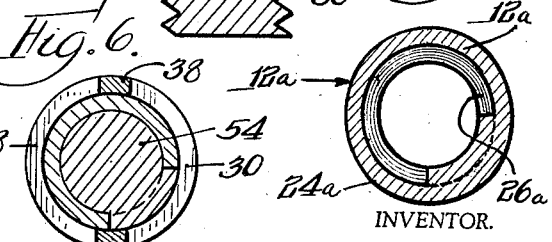

2,914,106
SERRATED, EXPANSIBLE LOCK NUT

Thomas R. Boyd, Park Ridge, Ill., assignor to Illinois Tool Works, Chicago, Ill., a corporation of Illinois Application February 26, 1957, Serial No. 642,498

5 Claims. (Cl. 151—21)

The present invention relates to a novel fastening device, and more particularly to a novel blind fastening device adapted to connect apertured workpieces or panels.

An important object of the present invention is to provide a novel blind fastening device of relatively simple and economical construction, which fastening device may be utilized for detachably connecting a plurality of apertured workpieces in abutting or flush relationship.

A more specific object of the present invention is to provide a novel blind fastening device having the characteristics mentioned above and including a screw member and a cooperable substantially tubular nut member adapted to be quickly and easily and securely applied to apertured workpieces and constructed so as to resist unauthorized retrograde movement of the screw member.

Other objects and advantages of the present invention will become apparent from the following description and the accompanying drawings wherein:

Fig. 1 is a partially exploded perspective view showing elements of the novel fastening device of the present invention and a pair of apertured workpieces to be connected thereby;

Fig. 2 is an enlarged fragmentary view partially in cross section and showing the fastening device partially assembled with the workpieces;

Fig. 3 is a view similar to Fig. 2 but showing the fastening device fully applied to the workpieces;

Fig. 4 is a fragmentary sectional view similar to Fig. 3 but shows the tubular nut element assembled with a workpiece after the cooperable screw member has been removed therefrom;

Fig. 5 is a fragmentary sectional view taken along line 5—5 in Fig. 4;

Fig. 6 is a sectional view taken along line 6—6 in Fig. 3; and

Fig. 7 is a sectional view showing a slightly modified form of the novel tubular nut member.

Referring now more specifically to the drawings wherein like parts are designated by the same numerals throughout the various figures, a fastening device 10 incorporating features of the present invention is shown in Figs. 1–6 and comprises a tubular nut member 12 and a cooperable screw member 14. As shown in the drawings, these members are adapted to connect workpieces or panels 16 and 18 having aligned apertures 20 and 22 therethrough.

The tubular nut member is provided with a first end section 24 which is adapted to project beyond the inner or back side of the workpiece 16 when the nut member is applied to the workpiece as shown in Figs. 3 and 4. This end section of the tubular member is provided with internal helical thread convolutions 26 and has a relatively thick wall section so that it has the desired strength and ruggedness to resist axial collapsing or stripping of the threads when the screw member is applied thereto as will be described below. The outer surface of the end section 24 is preferably smooth and has a diameter slightly less than the diameter of the aperture 20 in the workpiece 16 so as to facilitate insertion thereof through the workpiece aperture. It is to be noted that this end portion of the tubular nut member is provided with means for constantly resiliently gripping or binding the screw member so as to obtain a prevailing torque which functions to resist unauthorized retrograde rotation of the screw member after the screw member has been fully applied to the nut member as will be described below. In the embodiment shown in Figs. 1 through 6 the means for resiliently gripping and locking the screw member comprises oppositely disposed end sections 28 and 30 of the end portion, which end sections are separated from the remainder of the end portion by narrow slots 32 and 34 respectively and are integrally joined to the remainder of the end portion 24 by short connecting sections 36 and 38. As shown best in Fig. 4, the sections 28 and 30 are initially deformed so as partially to close the slots and axially shift the thread segments on the sections 28 and 30 sufficiently to misalign them with respect to immediately adjacent thread segments on the remainder of the end portion 24. When the screw member is applied to the nut member, it causes the thread segments on the sections 28 and 30 to be shifted so as to become properly aligned with the remaining thread segments and this causes the sections 28 and 30 to be deflected so as to open the slots as shown in Figs. 2 and 3. The inherent resiliency of the material such as steel from which the nut member is made tends to return the sections 28 and 30 to their axially collapsed positions and thereby causes the thread segments to bind on the screw member.

The tubular nut member has an intermediate portion 40 which is also adapted to extend beyond the inner side of the workpiece 16 when the nut member is fully applied to the workpiece. The intermediate portion has an internal diameter at least as large and preferably slightly larger than the maximum diameter of the internal thread convolutions, or, in other words, the internal diameter of the section 40 is preferably slightly larger than the outside diameter of threads on the screw member 14 so as to avoid substantial interference with such threads. Furthermore, the transverse cross sectional wall thickness of the intermediate portion 40 is less than the wall thickness of the end portion 24 so that the thin walled intermediate portion may be relatively easily axially collapsed and radially expanded in the manner described below. The nut member has an opposite or trailing end portion 42 which preferably is provided by a simple continuation of the intermediate portion 40. The portion 42 has an outside diameter which is initially at least as great as the diameter of the workpiece aperture 20 so that this portion of the nut member will engage the margin of the workpiece aperture when the nut member is inserted into the aperture. Furthermore, the outer surface of the end portion 42 is provided with a plurality of circumferentially spaced axially extending protuberances or teeth 44 for biting into the wall of the workpiece aperture and resisting rotation of the nut member relative to the workpiece. The free terminal end of the portion 42 is beveled as indicated at 46 for the purpose described below. The screw member 14 is provided with an enlarged head 48 which in the embodiment shown is beveled and is adapted to seat in a countersunk portion of the workpiece aperture 22. An axially extending shank 50 of the screw member has a first portion 52 adjacent the head, which portion has a smooth wall and has a diameter substantially similar to the diameter of the workpiece apertures 20 and 22. A reduced diameter portion 54 of the shank is provided with helical thread convolutions 56 cooperable with the thread convolutions of the nut member. A beveled shoulder 58 is formed on the shank between the portions 52 and 54 thereof, which shoulder is adapted to engage the beveled end of the nut member.

When assembling the fastening device with a work structure, the entering end portion 24 of the nut member is inserted through the aperture of the workpiece 16 and the nut member is pushed into the aperture until the trailing beveled end 46 thereof is disposed beneath the outer surface of the workpiece 16 and so that the nut member portions 24 and 40 project beyond the inner surface of the workpiece as shown in Fig. 2. The nut member may be positioned in the workpiece 16 by means of a special tool, not shown, and notches 57 are provided for engagement with lugs of the tool which prevent the nut member from rotating during assembly. Another type of tool means which does not require the notches 57 could be used. This tool means comprises a mandrel adapted to be threaded into the nut member and an annular shoulder surrounding the mandrel and adapted to engage the end of the nut member. After the mandrel and nut member are inserted into the workpiece aperture, a direct axial pull is applied to the mandrel to upset the intermediate portion 40. Such preliminary assembly of the nut member may also be readily accomplished by threading the nut member onto the screw member which is assembled with the workpiece 18 and freely rotatable therein and then forcing the nut member and screw member simultaneously down through the workpiece 16. Final assembly of the elements is accomplished quickly and easily merely by turning the screw member in the proper direction. When this is done, the nut member which is held against rotation by engagement of the protuberances 44 with the workpiece 16 has its beveled trailing end 46 drawn tightly against the beveled shoulder 58 of the screw member. The beveled shoulder tends to expand the trailing end of the nut member so that it is urged more aggressively into engagement with the workpiece further to restrain rotation of the nut member within the workpiece aperture. Upon continued rotation of the screw member, the intermediate portion of the nut member is clamped between the threads of the screw member and the shoulder 58 of the screw member so that it is placed under a compressive force. This compressive force causes the intermediate portion to be axially collapsed or folded and, at the same time, radially expanded as shown in Figs. 3 and 4 so as to provide annular shoulder means engageable with the inner surface of the workpiece 16 to prevent the nut member from being drawn upwardly or outwardly through the workpiece aperture.

It is particularly to be noted that the length of the member end portion 42 is such that its trailing terminal end is disposed completely within the outer surface of the workpiece 16 so that the workpiece 18 may be secured flush against the workpiece 16 in the manner shown. In addition, the large diameter shank portion 52 of the screw member preferably is sufficiently long so that it extends into the aperture in the workpiece 16 and serves to lock the workpieces 16 and 18 against any tendency to shift transversely of the axis of the fastening device. In connection with this, it will be apparent that the large diameter screw shank portion 52 serves to absorb any shear stresses that may be imparted to the fastening device as a result of any tendency for the workpieces to shift relative to each other. It is further to be noted that after the fastening device has been fully applied to the work structure as shown in Fig. 3, the screw member may be removed, if desired, by applying a reverse torque thereto sufficient to overcome the locking torque provided by the resilient sections 28 and 30 so as to permit removal of the workpiece or panel 18 as shown in Fig. 4. The nut member will remain in assembled relationship with the workpiece 16 since the end portion 42 thereof aggressively engages the margin of the workpiece aperture whereby the workpiece or panel 18 may again be secured to the workpiece 16 without requiring the use of a new fastening device. In other words, the screw member may be repeatedly removed from and applied to the same nut member connected to the workpiece as shown in Fig. 4. If desired, the aperture 22 may be enlarged so that the nut member may be placed on the screw and inserted through the aperture 22 and into the hole 20 without scoring the edge of the aperture 22 by the teeth. Also, the screw portion could be enlarged and shortened so as to engage the edges of the enlarged hole 22.

Fig. 7 shows a slightly modified nut member 12a which is identical to the nut member described above except for the formation thereof which provides the means for resiliently gripping or locking the screw member against unauthorized retrograde rotation. More specifically, in this embodiment the above described sections 28 and 30 have been eliminated and instead the threaded entering end portion 24a of the nut member is provided with an oval transverse cross sectional shape which has a minor axis less than the diameter of the threaded screw shank portion. Thus, when the threaded screw shank portion is turned into the portion 24a of the nut member, the portion 24a is resiliently deflected or deformed from its oval configuration toward a circular configuration. The inherent resiliency of the nut member material tends to return the portion 24a toward its oval configuration so that the nut member threads grip or bind the screw member threads.

While the preferred embodiments of the present invention have been shown and described herein, it is obvious that many structural details may be changed without departing from the spirit and scope of the appended claims.

The invention is claimed as follows:

1. A fastening device for connecting first and second apertured workpieces comprising a tubular nut member connectable with said first workpiece, and a cooperable screw element insertable through said second workpiece and into said nut member, said screw element including a head portion, a first shank portion of predetermined diameter adjacent said head portion, a reduced diameter threaded shank portion, and annular inwardly tapering shoulder means between said shank portions, said tubular nut member having a substantially uniform external diameter through the length thereof substantially equal to said predetermined diameter, said tubular nut member including a first end portion having a predetermined wall thickness and having internal thread means having a predetermined maximum diameter and being cooperable with said threaded shank portion, an intermediate axially collapsible and radially expandable portion having a wall thickness less than said predetermined thickness and having an internal diameter at least as large as said predetermined maximum diameter for avoiding substantial interference with said threaded shank portion, an opposite end section adapted to be disposed within the aperture of said first workpiece with a free end thereof terminating prior to extending substantially beyond a side of said first workpiece adjacent said second workpiece so that said second workpiece may be positioned flush against said first workpiece, said opposite end section including external protuberance means engageable with a margin of the first workpiece aperture for restraining rotation of the nut member relative to said first workpiece, said opposite end portion having a free beveled terminal end engageable with said tapering shoulder means of the screw member during tightening of the screw member for expanding said opposite end portion into aggressive engagement with the margin of said first workpiece, said first end portion and said intermediate portion projecting beyond an opposite side of said first workpiece when the nut member is fully applied thereto, said intermediate portion being axially collapsed and radially expanded during tightening of the screw member to form radially projecting shoulder means engageable with said last mentioned side of the first workpiece to prevent the nut member from being pulled through the first workpiece aperture, and means integral with said first end portion for resiliently gripping the threaded shank portion of the screw member when the screw member is applied to the nut member for resisting unauthorized retrograde rotation of the screw member.

2. A fastening device, as defined in claim 1, wherein said first end portion of the nut member comprises means for resiliently gripping the threaded shank portion of the screw member when the screw member is applied to the nut member for resisting unauthorized retrograde rotation of the screw member.

3. A fastening device, as defined in claim 2, wherein said last mentioned means comprises a terminal end section having an internal thread segment and integrally joined to the remainder of said end portion, said thread segment being offset with respect to an immediately adjacent thread segment on the remainder of said first end portion so that upon application of said threaded shank portion, said terminal end section will be deflected so as resiliently to urge the thread segment thereof into gripping engagement with the threaded shank portion.

4. A fastening device, as defined in claim 2, wherein said last mentioned means comprises a section of said first end portion having a generally oval transverse cross sectional shape, said oval section being resiliently deflected toward a circular cross sectional shape upon the application of said threaded shank portion thereto.

5. In a blind fastening device, a tubular nut member having a predetermined substantially uniform external diameter throughout its length, said nut member including a first end portion having a predetermined wall thickness and having internal thread means having a predetermined maximum diameter, an intermediate axially collapsible and radially expandable portion having a wall thickness less than said predetermined thickness and having an internal diameter at least substantially as large as said predetermined maximum diameter, and an opposite end portion for location in a workpiece aperture for enabling a second workpiece to be positioned flush against the first mentioned workpiece when the nut member is fully applied to the first mentioned workpiece, said first end portion including means resiliently engageable with a screw member when the screw member is applied to the nut member for resisting unauthorized retrograde rotation of the screw member, and said opposite end portion comprising an inwardly beveled terminal end surface engageable by a screw member for expanding said opposite end portion into aggressive engagement with said first mentioned workpiece when the screw member is applied to the nut member, said first end portion and said intermediate portion projecting outwardly of an opposite side of the first mentioned workpiece when the nut member is fully applied thereto, said opposite end portion having an internal diameter at least as great as said predetermined maximum diameter, and an external projection means on said opposite end portion engageable with a margin of said first mentioned workpiece aperture for preventing rotation of the nut member within said first mentioned workpiece, said intermediate portion being axially collapsible and radially expandable during application of a screw member to the nut member to form radially projecting shoulder means engageable with said last mentioned side of the first mentioned workpiece to prevent the nut member from being pulled through the first mentioned workpiece.

References Cited in the file of this patent

UNITED STATES PATENTS

| | | |
|---|---|---|
| 332,540 | Law | Dec. 15, 1885 |
| 570,786 | Church | Nov. 3, 1896 |
| 1,519,375 | Heintz | Dec. 16, 1924 |
| 2,304,310 | Luce | Dec. 8, 1942 |
| 2,379,786 | Bugg et al. | July 3, 1945 |
| 2,392,133 | Eklund | Jan. 1, 1946 |
| 2,544,304 | Eckenbeck et al. | Mar. 6, 1951 |
| 2,670,021 | Torresen et al. | Feb. 23, 1954 |

FOREIGN PATENTS

| | | |
|---|---|---|
| 1,062,244 | France | Dec. 2, 1953 |